United States Patent
Weston et al.

(10) Patent No.: US 7,027,104 B2
(45) Date of Patent: Apr. 11, 2006

(54) VIDEO SIGNAL PROCESSING

(75) Inventors: Martin Weston, Petersfield (GB); William Beningfield Collis, Winchester (GB)

(73) Assignee: Snell & Wilcox Limited, (GB)

( * ) Notice: Subject to any disclaimer, the term of this patent is extended or adjusted under 35 U.S.C. 154(b) by 549 days.

(21) Appl. No.: 10/257,149

(22) PCT Filed: Mar. 26, 2001

(86) PCT No.: PCT/GB01/01332

§ 371 (c)(1), (2), (4) Date: Feb. 24, 2003

(87) PCT Pub. No.: WO01/78379

PCT Pub. Date: Oct. 18, 2001

(65) Prior Publication Data
US 2003/0156222 A1 Aug. 21, 2003

(51) Int. Cl.
H04N 5/213 (2006.01)

(52) U.S. Cl. .................................. 348/616; 382/275

(58) Field of Classification Search ................ 348/622, 348/616, 607, 615–617, 125, 97, 98; 382/275; H04N 5/213
See application file for complete search history.

(56) References Cited

U.S. PATENT DOCUMENTS

| 5,589,887 A | * | 12/1996 | Wischermann | 348/616 |
| 5,978,047 A | * | 11/1999 | May | 348/616 |
| 5,987,187 A | * | 11/1999 | Wischermann | 382/275 |
| 6,388,704 B1 | * | 5/2002 | Wischermann | 348/125 |

FOREIGN PATENT DOCUMENTS

| EP | 09 969 658 | | 7/1999 |
| GB | 2 305 054 | | 7/1996 |
| GB | 2370933 | * | 7/2002 |

* cited by examiner

Primary Examiner—Michael H. Lee
(74) Attorney, Agent, or Firm—R. Lewis Gable; Cowan, Liebowtiz & Latman, P.C.

(57) ABSTRACT

In video scratch repair, scratches are treated as additive pedestals which are constant or slowly changing along the scratch. For a given picture, these pedestals are estimated and subtracted from the video input to reveal original picture detail. The pedestal can be estimated by heavily filtering along the direction of the presumed scratch, the output of a prior art scratch detector.

10 Claims, 3 Drawing Sheets

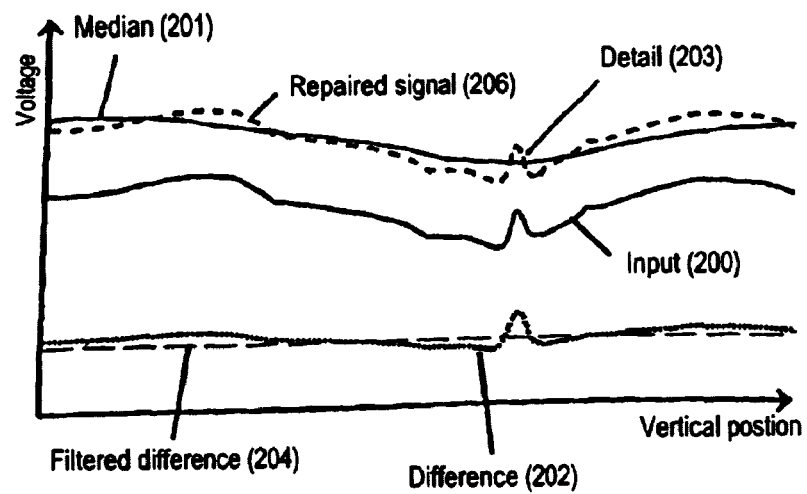
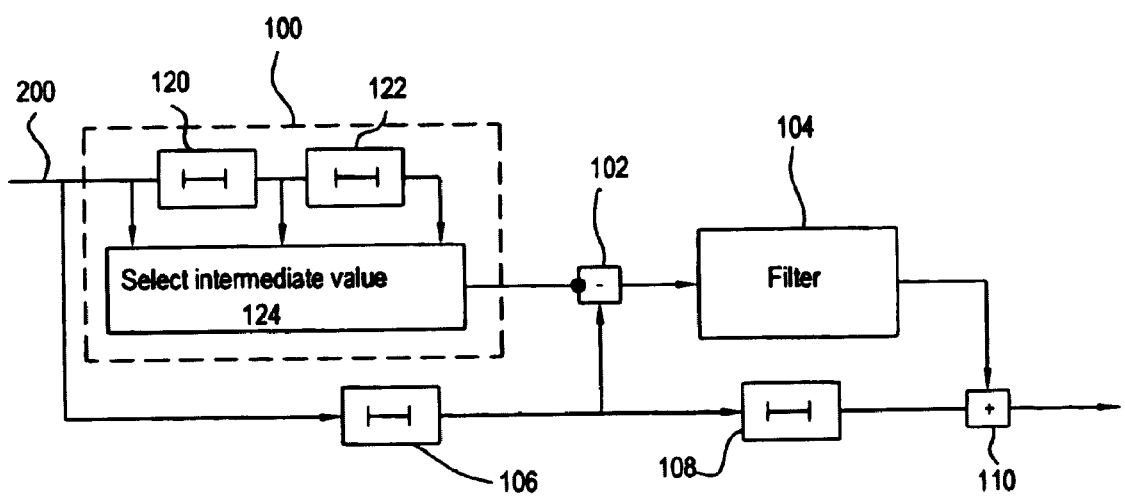
Fig. 3
Fig. 4

VIDEO SIGNAL PROCESSING

This invention relates to video signal processing and particularly to the repair of scratches in video archives.

Many attempts have been made to detect and repair scratches in archive material. The most common approach is to detect the scratch with some form of detector, remove the offending pixels and then interpolate the missing data from some nearby data. A drawback-with this technique is that the repair is invariably formed from some nearby filtered data, which may look smooth and unnatural. This can leave the repair very visible. Even repairs which are not noticeable on a still image, may become very objectionable on a moving sequence.

It is accordingly an object of one aspect of the present invention to provide an improved method of scratch repair.

Accordingly, the present, invention consists in one aspect in a method of repairing a video scratch or like artifact, comprising the steps of estimating an additive pedestal, which is constant or slowly changing along the scratch or like artifact, and subtracting the estimate of this pedestal from the video input to reveal original picture detail.

Advantageously, the pedestal is estimated by filtering, along the direction of the scratch, the output of a scratch detector.

Suitably, the estimate of the pedestal is clipped prior to subtraction from the video input.

In another aspect, the present invention consists in apparatus for repairing a video scratch or like artifact, comprising a scratch detector, a filter for averaging the output of the scratch detector along the direction of the assumed scratch to estimate an additive pedestal, which is constant or slowly changing along the scratch or like artifact, and a subtractor for subtracting the estimate of this pedestal from the video input to reveal original picture detail.

In yet a further aspect, the present invention consists in apparatus for repairing a video scratch or like artifact, comprising a median filter; a filter for averaging the output of the median filter along the direction of the assumed scratch to estimate an additive pedestal, which is constant or slowly changing along the scratch or like artifact, and a subtractor for subtracting the estimate of this pedestal from the video input to reveal original picture detail.

Advantageously, the pedestal is estimated by subtracting the output of a prior art scratch removal system from the input and filtering along the direction of the scratch.

The basis of this invention is the unexpected recognition that many scratches are additive in their effect upon the resultant video signal. That is, a scratch often just represents a change in the local dc level of the pixel and it is possible to see the original information under the scratch. It would be easy to condemn this approach on the ground that not all scratches are additive; some are so deep that no original data remains in the scratch. However in doing this one is throwing out a repair technique that performs extremely well on the majority of scratches, albeit not all scratches. It may also be necessary to have a separate repair strategy for very deep scratches.

Prior art approaches assume that scratches are missing data. So damaged pixels are replaced by good pixels from nearby, or by interpolating between several nearby pixels. For example, the well-known median filter replaces the damaged pixel either by a pixel to the left or by a pixel to the right.

The present invention recognises that, in most cases, the scratch is actually an additive pedestal, which changes only slowly along the scratch. If this pedestal is estimated and subtracted, the original picture detail is revealed.

The pedestal can in one convenient form of the invention be estimated by subtracting the output of a prior art scratch removal system from the input, and heavily filtering along the scratch. This heavy filtering removes most of the artefacts introduced by the prior art, since these are usually rapidly varying. But the filtering preserves the pedestal, because it is slowly varying. The pedestal can then be subtracted from the original scratched picture to leave an unscratched image.

The invention will now be described by way of example with reference to the accompanying drawings, in which:

FIG. 3 is a diagram illustrating certain voltage levels in the circuit arrangement of FIG. 2;

FIG. 4 is a block diagram illustrating a further embodiment of the present invention;

Figure 1:
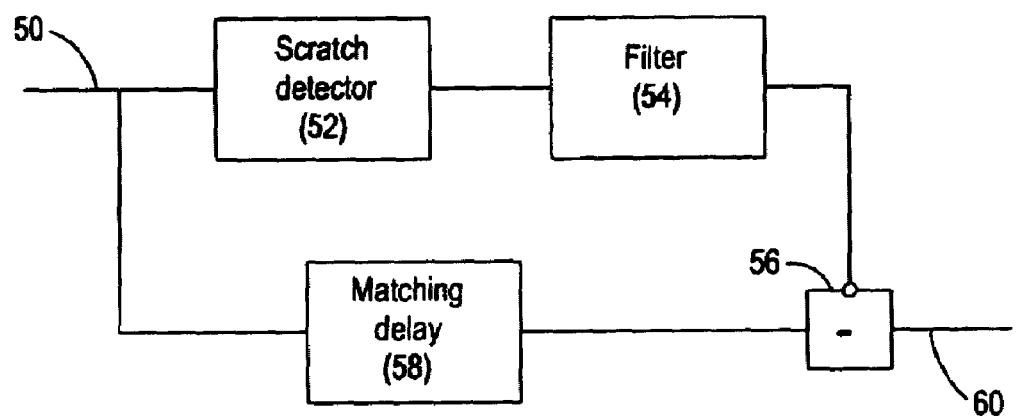
FIG. 1 is a block diagram illustrating an embodiment of the present invention.

Referring initially to FIG. 1, a video signal at input terminal (50) is passed to a scratch detector (52) which can take a wide variety of known forms. The output of this scratch detector is then heavily filtered along the direction of the scratch in a filter (54). If the assumed scratches are vertical, filter (54) will be a vertical filter averaging over 10 or more, or preferably 30 or more lines. The effect of this filtering is to generate the pedestal or dc level which is assumed to be the video signal representation of the scratch. This pedestal is then subtracted in a subtractor (56) from the input video signal, suitably delayed in a matching delay (58). The resulting, repaired video signal appears at the output terminal (60).

In a further embodiment, the present invention may take advantage of not just a prior art scratch detector, but a prior art scratch remover, comprising both a scratch detector and a scratch repairer. Such an arrangement is shown in FIG. 2, with certain voltage waveforms from the circuit of FIG. 2 being shown in FIG. 3.

Figure 2:
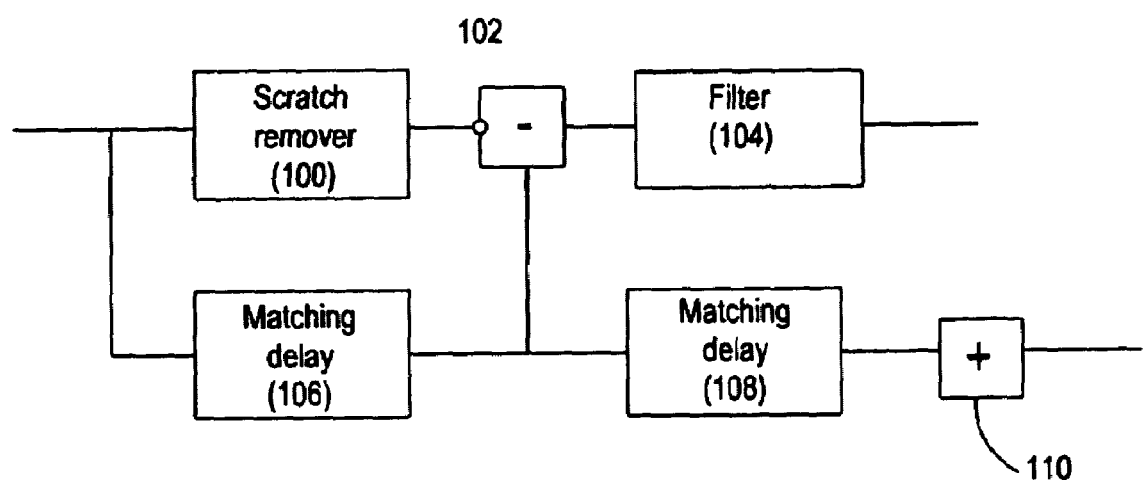
FIG. 2 is a block diagram illustrating a further embodiment of the present invention.

In FIG. 2, the input video signal (shown at 200 in FIG. 3) is taken to a scratch remover (100) which both detects and repairs scratches. The repair is typically conducted with a median filter. The output of the scratch remover is subtracted from the video input signal, suitably delayed in a matching delay (106), in a subtractor (102). The resulting signal is filtered in a filter (104) and the output is in this case added to the input video signal, further delayed in a matching delay (108), in an adder (110).

FIG. 3 illustrates the signals produced by the system shown in FIG. 2, where a vertical picture "slice"containing a scratch has been taken. The input signal (200) thus has a lower voltage than it should, as the picture is darker in the scratched area. The signal (200) is input to the median filter typically employed in the prior art scratch repair system (100) to produce a median filtered signal (201). The median filter, removes some of the detail from the picture, particularly sharp details such as that indicated at 203. Such a detail might be produced by a steep diagonal line, not present in the areas either side of the scratch used by the median filter to reconstruct the damaged area. The output of the median filter is then subtracted (102) from the input signal, producing a difference signal (202). This difference signal (202)

thus contains the detail which was present in the input signal (albeit at lower voltage), and was removed in the median filter. The difference (202) is then heavy filtered (104), to produce a filtered difference signal (204). This is the pedestal required—the near constant modification made by the scratch. This is then removed from the input signal to produce the repaired signal (206). In this case, where the scratch is dark, the pedestal is added to the signal (200) at block 110, replacing the "lost" voltage.

Typically, film scratches run vertically and therefore the filter should filter vertically. A 32 line running sum filter is found to remove most picture artefacts whilst preserving the scratch.

The scratch repair method described above is applicable to any system of detection which might be employed. It will also be applicable to arrangements where the scratch repair involves systems other than median filters.

Certain prior art scratch removers do not have a scratch detection function and apply the median filter or other scratch repair over the entire image.

There is then generally a design compromise to be made between:
filtering actively to ensure all scratches are repaired, but potentially doing damage to scratch-free areas of the picture; and
filtering less actively to minimise damage done to scratch-free areas of the picture, but potentially missing certain scratches.

In the case of a median filter scratch repair, the design choice lies usually in the separation of the taps of the filter. Thus, a median filter having closely spaced taps will be expected to do little damage to a picture but will fail to repair scratches beyond a certain maximum width. Increasing the spacing of the taps will increase the maximum width of scratches that can be repaired, but is likely also to increase the amount of damage done.

The present invention addresses this problem since the filtering operation will dramatically reduce the damage done to scratch-free areas, where the prior art scratch remover has no scratch detection. This is achieved by putting an upper bound on the size of what may be considered a scratch in the input material. It is accordingly possible to intervene more actively within the median filter, for example to increase the spacing of the taps.

An example is given in FIG. 4, which shares the reference numerals of FIG. 2, with the scratch remover shown explicitly as a median filter having pixel delays (120; 122) providing three inputs to a block (124) which operates to select the middle ranked value.

The voltage signals depicted in FIG. 3 are also representative of the behaviour of the circuit of FIG. 4.

Typically, the pedestal to be removed will have introduced a "sit" in the signal, giving a set voltage difference in the scratched area. However, in some material the scratches will have introduced a "gain" change in the signal, where the voltage is altered by a certain percentage. Though the percentage change may be constant, the difference in voltage may not. In such cases, the difference signal (202) may require alteration prior to filtering, in order to yield the correct pedestal. This can be achieved, for example, by a taking a log of the difference signal (202) to be input to the filter (104).

It should be noted that, whilst FIG. 3 illustrates a case in which the scratch is of constant "depth", scratches often increase or decrease in depth. However, since this variation of the voltage response in the vertical direction is slow compared to; the variation in either the picture detail, or the artefacts introduced by the median filter, the pedestal can be readily identified using the system described.

Figure 5:
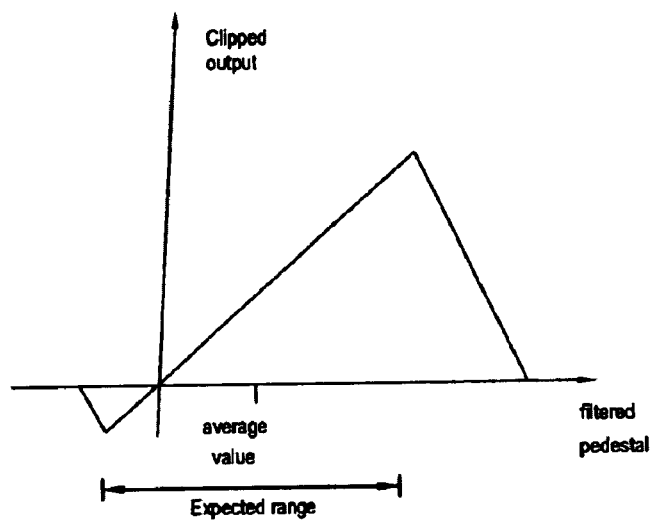
FIG. 5 is a diagram illustrating the operation of a modification.

Although in this approach the system will remove scratches very efficiently, vertical features which last for a significant portion of the 32 lines will not be averaged out and so will be removed as if they are scratches. This can be prevented by the addition of a clipper whose response is as shown in FIG. 5.

Scratches tend to be fairly uniform over the length of the column and so the difference between the average of the scratched column and an individual pixel in the scratch is small. Picture features are more likely to be shorter in length and so the-difference between the averaged column and an individual pixel in the column will be larger. Hence the clipper works by allowing through signals close to the average (the scratch). But signals outside the expected range (picture features) are progressively reduced to zero.

Figure 6:
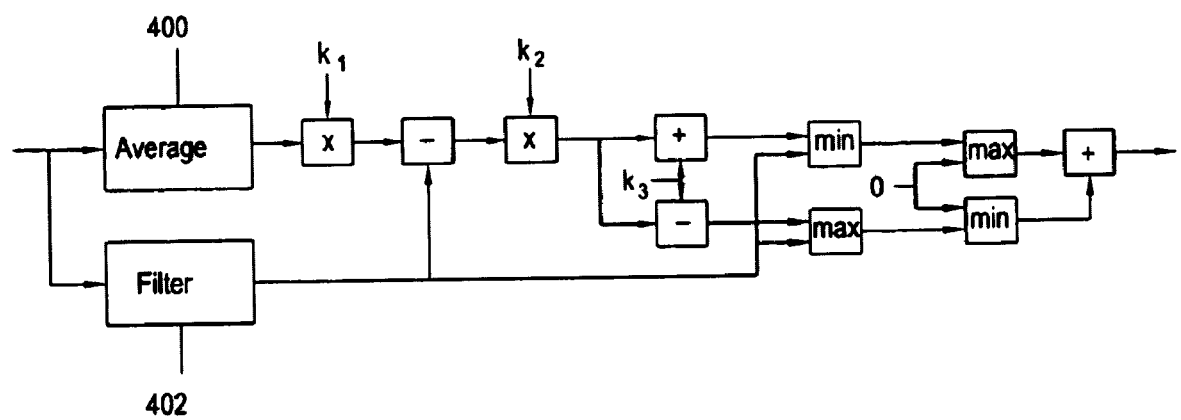
FIG. 6 is a block diagram illustrating a further embodiment, incorporating the modification.

FIG. 6 shows the arrangement of circuit elements to achieve the required response, replacing block 104 in FIG. 4. The difference signal (202) is input to the averager (400) and to the filter (402), which is in essence the same as filter 104 in FIG. 4. The parameters $k_1$, $k_2$ and $k_3$ allow for the response to be adjusted to suit the length and uniformity of the scratch. $k_3$ controls the width of the expected range when the average is small. $k_1$ controls the rate at which the expected range increases with increasing average. $k_2$ controls the rate at which the output is progressively reduced to zero, outside the expected range. Thus the features which are close to the average are allowed to pass, and those which are sufficiently different from it are not.

It should be understood that this invention has been described by way of examples only and that numerous modifications are possible without departing from the scope of the invention. It will be recognised that although vertical scratches are common, the described arrangement can also operate to repair horizontal scratches with a horizontal filter to generate the pedestal of the scratch. It will also be understood that according to the scratch mechanism, the pedestal may be positive or negative and the effect of the scratch will sometimes be removed by adding rather than subtracting the output of the vertical or horizontal filter. Further, the embodiments described deal with scratches in the input material, but other defects, such as dirt and smears which may be present on film material, may also be corrected by these methods.

What is claimed is:

1. A method of repairing a video scratch or like artifact, comprising the steps of estimating en additive pedestal, which is constant or slowly changing along the scratch or like artifact, and subtracting the estimate of this pedestal from the video input to reveal original picture detail.

2. A method according to claim 1, wherein the pedestal is estimated by filtering along the direction of the scratch the output of a scratch detector.

3. A method according to claim 1, wherein the pedestal is estimated by subtracting the output of a prior art scratch removal system from the input and filtering along the direction of the scratch.

4. A method according to claim 2, in which the scratch is assumed to be vertical and the vertical filtering extends over at least 10 horizontal lines.

5. A method according to claim 4, in which the vertical filtering extends over approximately 30 horizontal lines.

6. A method according to claim 1, in which the estimate of the pedestal is clipped prior to subtraction from the video input.

7. Apparatus for repairing a video scratch or like artifact, comprising a scratch detector; a filter for averaging the output of the scratch detector along the direction of the assumed scratch to estimate an additive pedestal, which is constant or slowly changing along the scratch or like artifact, and a subtracter for subtracting the estimate of this pedestal from the video input to reveal original picture detail.

8. Apparatus according to claim 7, adapted to repair a vertical scratch or like artifact, wherein said filter is a vertical filter.

9. Apparatus for repairing a video scratch or like artifact, comprising a median filter, a filter for averaging the output of the median filter along the direction of the assumed scratch to estimate an additive pedestal, which is constant or slowly changing along the scratch or like artifact, and a subtractor for subtracting the estimate of this pedestal from the video input to reveal original picture detail.

10. Apparatus according to claim 9, adapted to repair a vertical scratch or like artifact, wherein said filter is a vertical filter.

* * * * *